United States Patent
Mahamuni et al.

(10) Patent No.: US 11,088,923 B2
(45) Date of Patent: Aug. 10, 2021

(54) MULTI-STAGE AUTHORIZATION

(71) Applicant: International Business Machines Corporation, Armonk, NY (US)

(72) Inventors: Amol Bhaskar Mahamuni, Bangalore (IN); Nithyaraj G S, Erode (IN); Niroop Sathyam Moses J, Salem (IN)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 16/445,255

(22) Filed: Jun. 19, 2019

(65) Prior Publication Data

US 2020/0403883 A1 Dec. 24, 2020

(51) Int. Cl.
*H04L 12/24* (2006.01)
*H04L 29/06* (2006.01)

(52) U.S. Cl.
CPC .......... *H04L 41/28* (2013.01); *H04L 63/0428* (2013.01); *H04L 63/062* (2013.01); *H04L 63/0884* (2013.01); *H04L 63/10* (2013.01)

(58) Field of Classification Search
CPC ..... H04L 41/28; H04L 63/0428; H04L 63/10; H04L 63/062; H04L 63/0884; G06F 21/602–604; G06F 21/6218
See application file for complete search history.

(56) References Cited

U.S. PATENT DOCUMENTS

| | | | |
|---|---|---|---|
| 5,168,555 A | 12/1992 | Byers | |
| 7,257,835 B2* | 8/2007 | Jones | G06F 21/10 726/1 |
| 8,892,875 B1* | 11/2014 | Baldwin | H04L 9/083 713/165 |
| 10,110,585 B2* | 10/2018 | Ghafourifar | H04L 63/10 |
| 10,148,523 B1 | 12/2018 | Evans | |
| 2004/0143741 A1* | 7/2004 | Edwards | G07F 7/1008 713/176 |
| 2015/0106897 A1* | 4/2015 | Davis | G06F 21/32 726/7 |
| 2017/0039388 A1* | 2/2017 | Vas | H04L 63/107 |
| 2017/0109046 A1 | 4/2017 | Bender | |

FOREIGN PATENT DOCUMENTS

| | | |
|---|---|---|
| CA | 2500912 A1 | 4/2004 |
| ES | 2677709 T3 | 8/2018 |

* cited by examiner

*Primary Examiner* — Michael R Vaughan
(74) *Attorney, Agent, or Firm* — Brian M. Restauro (57) ABSTRACT

A task identification, an operator key, and a supervisor key are generated. The task identification is associated with a system administration task request and can include information from the request to initiate the system administration task request such as the system name. The operator key and the supervisor key are encrypted. Via a secure network, the task identification and the operator key are sent to an operator computing device and the supervisor key is sent to a supervisor computing device. In response to determining that the task identification is valid, the operator key returned from the operator computing device is decrypted. In response to determining that the decrypted operator key is valid, the encrypted supervisor key returned from the supervisor computing device is decrypted. In response to determining that the decrypted supervisor key is valid, an indication of a successful validation of the system administration task is provided.

20 Claims, 5 Drawing Sheets

MULTI-STAGE AUTHORIZATION

BACKGROUND

The present invention relates generally to the field of electronic authorization, and more particularly to providing multi-stage authorization for validating system administration tasks.

System administration of computing systems is an important function that is often handled by humans. These computing systems can include one or more mainframe computers, with each mainframe including several logical partitions (LPARs), each of which are equivalent to a separate mainframe computer. Computing systems operate behind the scenes handling critical tasks for financial institutions, air traffic control, the health care industry, and many government agencies, to name only a few. These computing systems allow our day-to-day lives to move forward with relative ease.

SUMMARY OF THE INVENTION

Embodiments of the present invention include an approach for providing multi-stage authorization for validating system administration tasks. In one embodiment, in response to receiving a request to initiate a system administration task, a task identification, an operator key, and a supervisor key are generated. The task identification is associated with the system administration task request. The task identification can include information from the request to initiate the system administration task request such as the system name. The generated operator key and the generated supervisor key are encrypted. The task identification and the operator key are sent to an operator computing device via a secure network. The supervisor key is sent to a supervisor computing device via the secure network. It is determined whether the task identification is valid. In response to determining that the task identification is valid, the operator key returned from the operator computing device is decrypted. It is determined whether the decrypted operator key is valid. In response to determining that the decrypted operator key is valid, the encrypted supervisor key returned from the supervisor computing device is decrypted. It is determined whether the decrypted supervisor key is valid. In response to determining that the decrypted supervisor key is valid, an indication of a successful validation of the system administration task is provided.

DETAILED DESCRIPTION

Embodiments of the present invention allow for providing multi-stage authorization for validating system administration tasks. A mainframe computer can include one or more logical partitions (LPARs) with each LPAR acting as a distinct, separate mainframe. Today, system administration of mainframe computers is handled via communication (e.g., telephone, e-mail, instant messaging, etc.) between a system administrator and an operator. This informal system can result in errors occurring if the communication(s) are not precise or if the instructions in the communication are not carried out properly. For example, shutting down the wrong LPAR in an air traffic control mainframe for a software upgrade could have catastrophic consequences Embodiments of the present invention recognize that there may be a method, computer program product, and computer system for providing multi-stage authorization for validating system administration tasks. In an embodiment, system administration for a mainframe-based computing system, which includes multiple LPARs, require several validations of security keys between the administrator and the operator before privileged system administration tasks are carried out. These cross validations provide the multi-stage authorizations found in the method, computer program product, and computer system and can help to prevent the inadvertent or unauthorized shutdown of a critical LPAR.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

Figure 1:
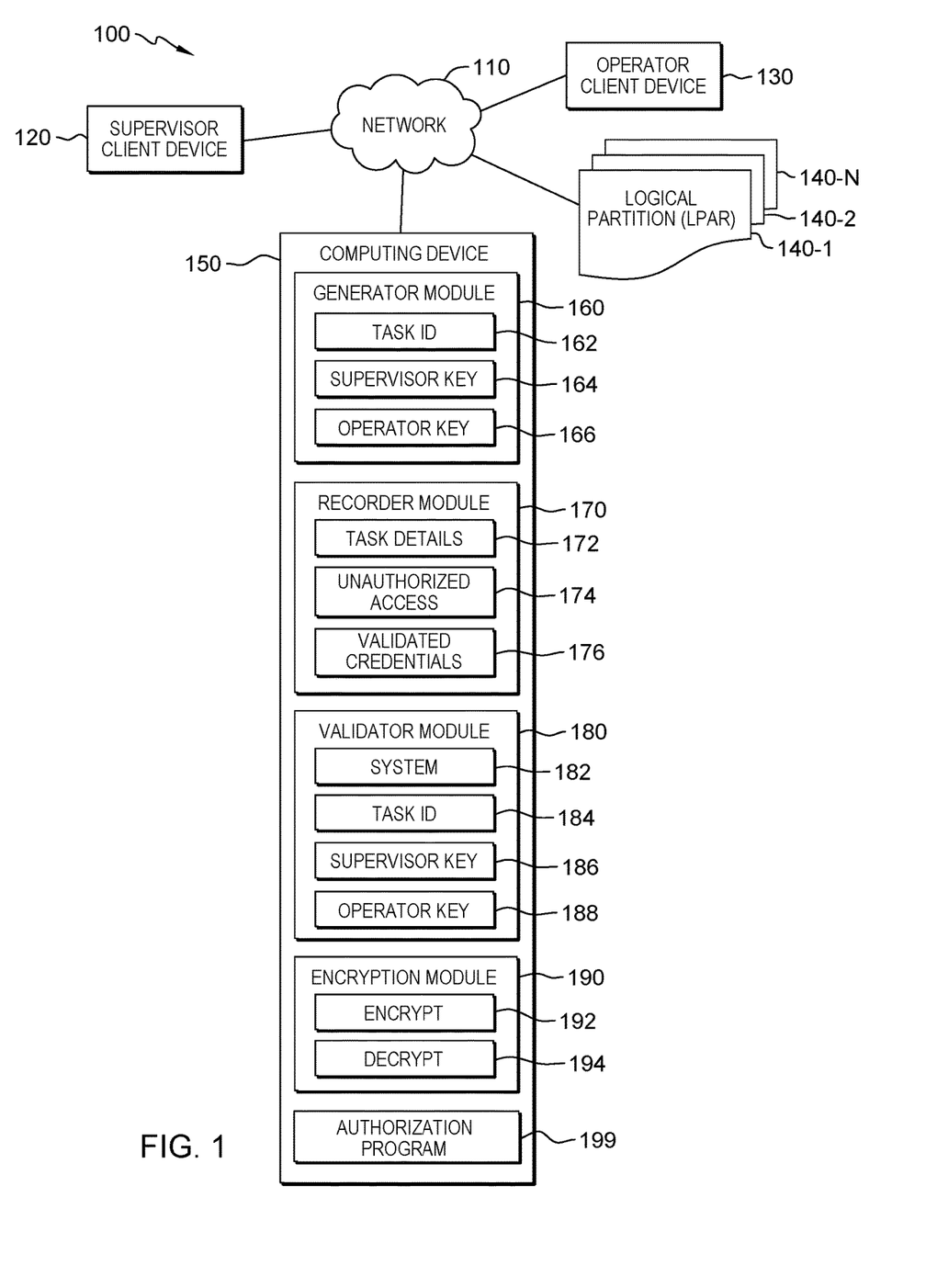
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes supervisor client device 120, operator client device 130, a plurality of logical partition (LPAR) 140-N, and computing device 150, interconnected by network 110. In this paper, discussion concerning LPAR 140-N is applicable for all the plurality of logical partitions 140-N (i.e., 140-1, 140-2, etc.). In example embodiments, computing environment 100 includes other computing devices (not shown in FIG. 1) such as smartwatches, cell phones, smartphones, wearable technology, phablets, tablet computers, laptop computers, desktop computers, other computer servers or any other computer system known in the art, interconnected with supervisor client device 120, operator client device 130, LPAR 140-N, and computing device 150 over network 110.

In embodiments of the present invention, supervisor client device 120, operator client device 130, LPAR 140-N, and computing device 150 are connected to network 110, which enables supervisor client device 120, operator client device 130, LPAR 140-N, and computing device 150 to access other computing devices and/or data not directly stored on supervisor client device 120, operator client device 130, LPAR 140-N, and computing device 150. Network 110 may be, for example, a short-range, low power wireless connection, a local area network (LAN), a telecommunications network, a wide area network (WAN) such as the Internet, or any combination of the three, and include wired, wireless, or fiber optic connections. In an embodiment, network 110 includes one or more wired and/or wireless networks that are capable of receiving and transmitting data, voice, and/or video signals, including multimedia signals that include voice, data, and video information. In general, network 110 is any combination of connections and protocols that will support communications between supervisor client device 120, operator client device 130, LPAR 140-N, and computing device 150, and any other computing devices connected to network 110, in accordance with embodiments of the present invention. In an embodiment, data received by another computing device (not shown in FIG. 1) in computing environment 100 is communicated to supervisor client device 120, operator client device 130, LPAR 140-N, and computing device 150 via network 110.

In embodiments of the present invention, supervisor client device 120 may be a laptop, tablet, or netbook personal computer (PC), a desktop computer, a personal digital assistant (PDA), a smartphone, a standard cell phone, a smart-watch or any other wearable technology, or any other hand-held, programmable electronic device capable of communicating with any other computing device within computing environment 100. In certain embodiments, supervisor client device 120 represents a computer system utilizing clustered computers and components (e.g., database server computers, application server computers, etc.) that act as a single pool of seamless resources when accessed by elements of computing environment 100. In general, supervisor client device 120 is representative of any electronic device or combination of electronic devices capable of executing computer readable program instructions. In an embodiment, computing environment 100 includes any number of supervisor client device 120. Supervisor client device 120 includes components as depicted and described in further detail with respect to FIG. 3, in accordance with embodiments of the present invention. Supervisor client device 120 also includes a user interface (UI), not shown in FIG. 1.

According to embodiments of the present invention, operator client device 130 may be a laptop, tablet, or netbook personal computer (PC), a desktop computer, a personal digital assistant (PDA), a smartphone, a standard cell phone, a smart-watch or any other wearable technology, or any other hand-held, programmable electronic device capable of communicating with any other computing device within computing environment 100. In certain embodiments, operator client device 130 represents a computer system utilizing clustered computers and components (e.g., database server computers, application server computers, etc.) that act as a single pool of seamless resources when accessed by elements of computing environment 100. In general, operator client device 130 is representative of any electronic device or combination of electronic devices capable of executing computer readable program instructions. In an embodiment, computing environment 100 includes any number of operator client device 130. Operator client device 130 includes components as depicted and described in further detail with respect to FIG. 3, in accordance with embodiments of the present invention. Operator client device 130 also includes a user interface (UI), not shown in FIG. 1.

In embodiments of the present invention, logical partition (LPAR) 140-N is a portion of hardware resources included in a mainframe computer set aside and virtualized as a distinct separate computer. In an embodiment, LPAR 140-N is a separate mainframe computer. According to embodiments of the present invention, LPAR 140-N includes, and runs, its own operating system and utilizes one or more mainframe system processors to run applications. LPAR 140-N includes components as depicted and described in further detail with respect to FIG. 3, in accordance with embodiments of the present invention.

According to embodiments of the present invention, computing device 150 may be a laptop, tablet, or netbook personal computer (PC), a desktop computer, a personal digital assistant (PDA), a smartphone, a standard cell phone, a smart-watch or any other wearable technology, or any other hand-held, programmable electronic device capable of communicating with any other computing device within computing environment 100. In certain embodiments, computing device 150 represents a computer system utilizing clustered computers and components (e.g., database server computers, application server computers, etc.) that act as a single pool of seamless resources when accessed by elements of computing environment 100. In general, computing device 150 is representative of any electronic device or combination of electronic devices capable of executing computer readable program instructions. In an embodiment, computing environment 100 includes any number of computing device 150. Computing device 150 includes components as depicted and described in further detail with respect to FIG. 3, in accordance with embodiments of the present invention. Computing device 150 also includes a user interface (UI), not shown in FIG. 1.

In an embodiment, computing device 150 includes generator module 160, recorder module 170, validator module 180, encryption module 190, and authorization program 199.

In an embodiment, generator module 160 provides a generating function of various attributes upon request. In an embodiment, the generate request can be from a person, such as a system supervisor or a system operator, or from a program, such as authorization program 199. According to embodiments of the present invention, attributes generated by generator module 160 include, but are not limited to, one or more task identifications (task id), one or more supervisor keys, and one or more operator keys. In an embodiment, a task id can be generated by any program known in the art capable of creating a unique, random identification number that can include any combination of letters, numbers, and other characters. According to embodiments of the present invention, a supervisor key and an operator key can be generated by any known method in the art capable of creating unique, random identification numbers that can include any combination of letters, numbers, and other characters. In an embodiment generator module 160 includes task id 162, supervisor key 164, and operator key 166.

In an embodiment of the present invention, task id 162 is the generator engine in generator module 160 that generates and stores any number of random task identifications. Further in the embodiment, supervisor key 164 is the generator engine in generator module 160 that generates and stores any number of random supervisor keys. Further yet in the embodiment, operator key 166 is the generator engine in generator module 160 that generates and stores any number of random operator keys.

According to embodiments of the present invention, recorder module 170 provides a recording function upon request. In an embodiment, the record request can be from a person, such as a system supervisor or a system operator, or from a program, such as authorization program 199. According to embodiments of the present invention, the recording function saves details to a memory. According to embodiments of the present invention, details recorded by recorder module 170 (i.e., details stored to memory) include, but are not limited to, task details, unauthorized access requests, and validated credentials. In an embodiment, the mainframe file system can be used to record the task details. In an embodiment, any program within the mainframe, including authorization program 199, can record unauthorized access requests and validated credentials to the file system of the mainframe. According to other embodiments of the present invention, the memory used by recorder module 170 may be storage that may be written to and/or read by authorization program 199. In one embodiment, the memory used by recorder module 170 resides on computing device 150. In another embodiment, the memory used by recorder module 170 resides on supervisor client device 120, operator client device 130, or LPAR 140-N. In yet other embodiments, the memory used by recorder module 170 may reside on any other device (not shown in FIG. 1) in computing environment 100, in cloud storage or on another computing device accessible via network 110. In yet another embodiment, the memory used by recorder module 170 may represent multiple storage devices within computing device 150. Examples of data stored to the memory used by recorder module 170 include the various task details being processed by a supervisor or an operator responsible for system administration of LPAR 140-N and unauthorized attempts to access one of LPAR 140-N. In an embodiment recorder module 170 includes task details 172, unauthorized access 174, and validated credentials 176.

In an embodiment of the present invention, task details 172 is the memory location in recorder module 170 that records information pertaining to all task details. Further in the embodiment, unauthorized access 174 is the memory location in recorder module 170 that records all attempts at unauthorized access. Further yet in the embodiment, validated credentials 176 is the memory location in recorder module 170 that records all of the validated credentials determined by authorization program 199.

In an embodiment, validator module 180 provides a validation function upon request. In an embodiment, the validation request can be from a person, such as a system supervisor or a system operator, or from a program, such as authorization program 199. According to embodiments of the present invention, the attributes validated by validator module 180 include, but are not limited to a system, a task id, a supervisor key, and an operator key. In an embodiment, the validation function for validating the system, task id, supervisor key, and operator key can be performed by any program known in the art capable of cross validating the system information, task id, supervisor key, and operator key to the comparable information coded and stored to the mainframe file system. In an embodiment validator module 180 includes system 182, task id 184, supervisor key 186, and operator key 188.

In an embodiment of the present invention, system 182 is the validation engine in validator module 180 that validates the system requiring a system administration task. Further in the embodiment, task id 184 is the validation engine in validator module 180 that validates any number of task identifications. Further yet in the embodiment, supervisor key 186 is the validation engine in validator module 180 that validates any number of supervisor keys. Further yet in the embodiment, operator key 188 is the validation engine in validator module 180 that validates any number of operator keys.

According to embodiments of the present invention, encryption module 190 provides encryption and decryption functions upon request. In an embodiment, the validation request can be from a person, such as a system supervisor or a system operator, or from a program, such as authorization program 199. In an embodiment, any encryption and decryption methods known in the art can provide the encryption/decryption functions for encryption module 190. In an embodiment validator module 180 includes encrypt 192 and decrypt 194.

In an embodiment of the present invention, encrypt 192 is the encryption engine in encryption module 190 that encrypts and stores any number of supervisor keys and operator keys. Further in the embodiment, decrypt 194 is the decryption engine in encryption module 190 that decrypts and stores any number of supervisor keys and operator keys.

In an embodiment, authorization program 199 may be a program, a subprogram of a larger program, an application, a plurality of applications, or mobile application software, which functions to provide multi-stage authorization for validation of system administration tasks. A program is a sequence of instructions written by a programmer to perform a specific task. In an embodiment, authorization program 199 runs by itself. In other embodiments, authorization program 199 depends on system software (not shown in FIG. 1) to execute. In one embodiment, authorization program 199 functions as a stand-alone program residing on computing device 150. In another embodiment, authorization program 199 works in conjunction with other programs, applications, etc., found in computing environment 100. In yet another embodiment, authorization program 199 is found on supervisor client device 120, operator client device 130 or LPAR 140-N. In yet another embodiment, authorization program 199 is found on other computing devices (not shown in FIG. 1) in computing environment 100, which are interconnected to computing device 150 via network 110.

In an embodiment, authorization program 199 receives a system administration (sysadmin) task request from a user. In an embodiment, responsive to receiving the sysadmin task request, authorization program 199 requests generator module 160 to generate of a task id, a supervisor key, and an operator key. In an embodiment, responsive to determining that the task id received from the operator is valid, authorization program 199 validates the privileged operator (first stage) via validator module 180. In an embodiment, responsive to determining that the decrypted operator key matches the original, encrypted operator key, authorization program 199 validates the encrypted operator key (second stage) via validator module 180. In an embodiment, responsive to determining that the decrypted supervisor key matches the original, encrypted supervisor key, authorization program 199 validates the encrypted supervisor key (third stage) via validator module 180. In an embodiment, responsive to successfully completing the first stage, the second stage, and the third stage, authorization program 199 indicates a successful validation of the sysadmin task.

Figure 2A:
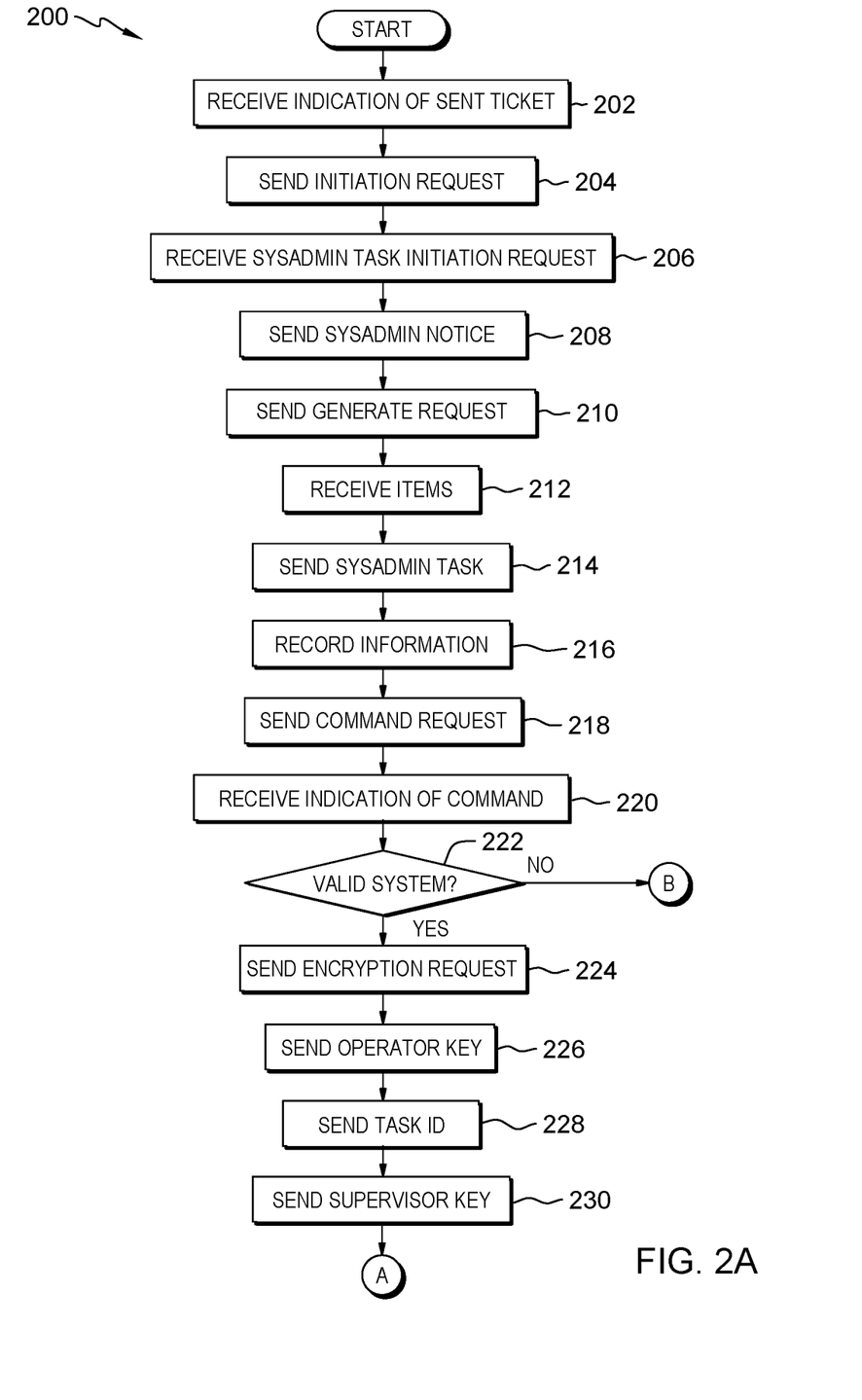
FIG. 2A-2C depicts a flowchart of a program for providing multi-stage authorization for validating system administration tasks, in accordance with an embodiment of the present invention.
Figure 2B:
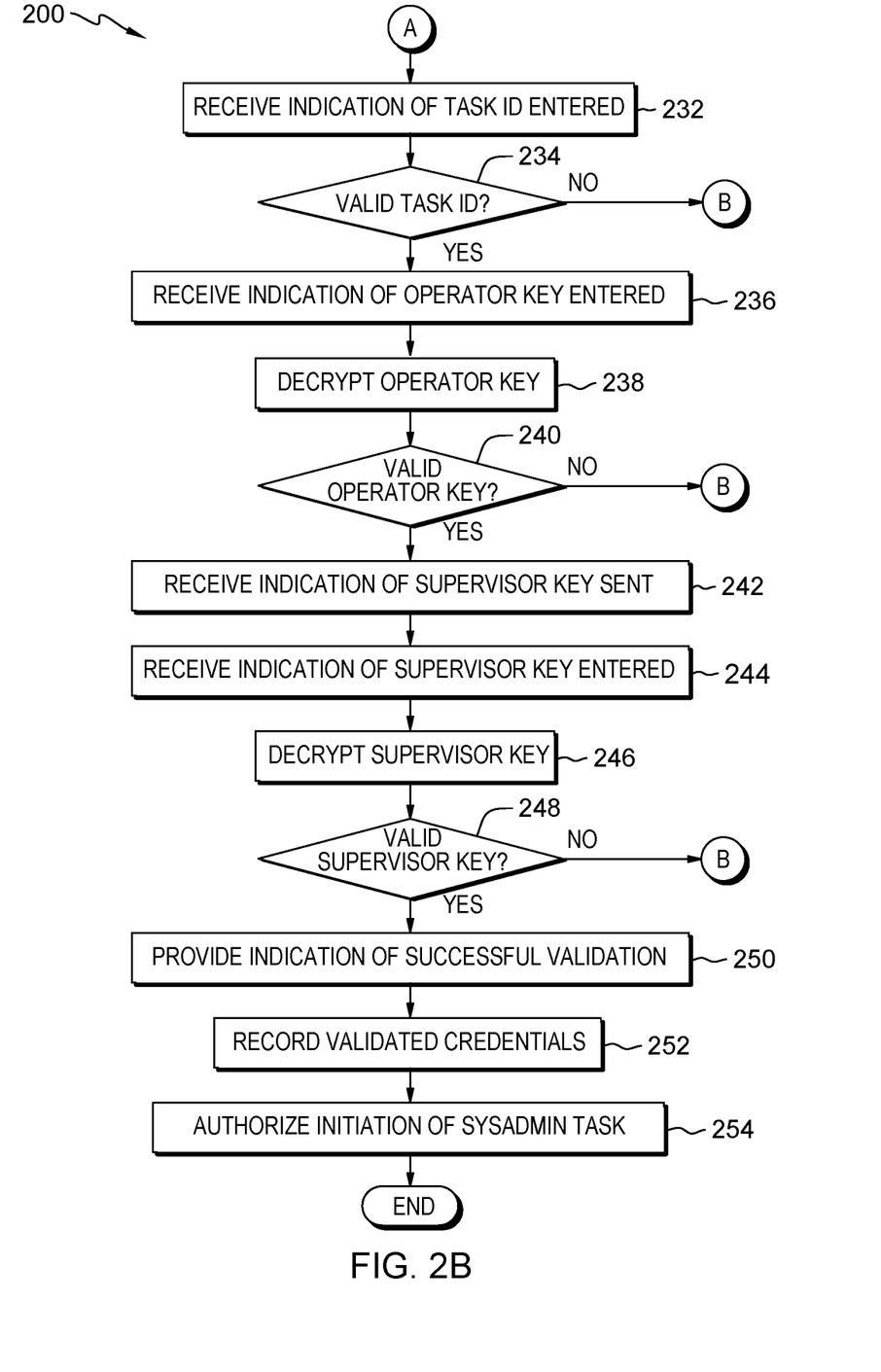
Figure 2C:
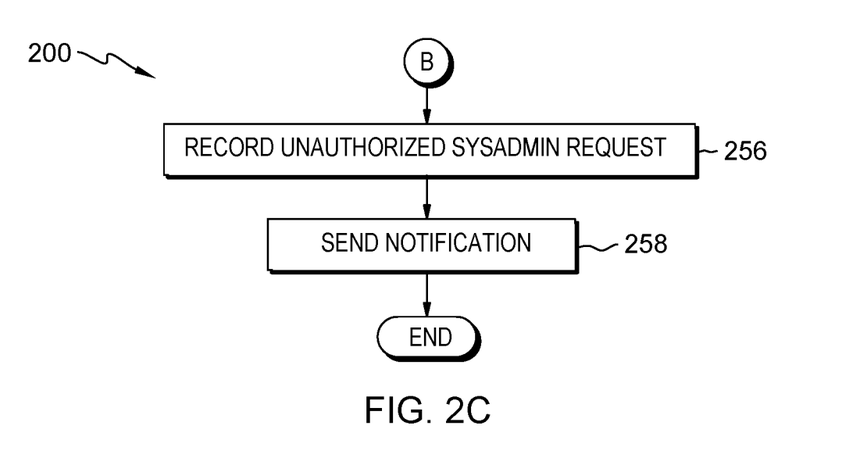

FIG. 2 is a flowchart of workflow 200 depicting a method for providing multi-stage authorization for validating system administration tasks. In one embodiment, the method of workflow 200 is performed by authorization program 199. In an alternative embodiment, the method of workflow 200 is performed by any other program working with authorization program 199. In an embodiment, a user, via a user interface (not shown in FIG. 1), invokes workflow 200 upon sending a request to operator client device 130. In an alternative embodiment, a user invokes workflow 200 upon accessing authorization program 199 on operator client device 130.

In an embodiment, authorization program 199 receives an indication of a sent ticket (step 202). In other words, authorization program 199 receives an indication that a system administrator supervisor (supervisor) was sent a ticket via a secure communication channel requesting a system administration (sysadmin) task. In an embodiment, the ticket was auto-generated by the system. In another embodiment, the ticket was submitted by a user (e.g., a help desk technician). According to an embodiment of the present invention, the sysadmin task can be a routine task such as a software update. According to another embodiment of the present invention, the sysadmin task can be an emergency task such as a component not operating properly. According to yet another embodiment of the present invention, the sysadmin task can be an installation or upgrade of computer hardware or software, routine automation, security policy maintenance, or problem troubleshooting. In an embodiment, authorization program 199 receives an indication that a ticket was sent over secure network 110 by an operator using operator client device 130 to a supervisor using supervisor client device 120 to indicate that a shutdown of LPAR 140-N was required. For example, Oscar the operator, using a secure network, sent a ticket to Sam the supervisor, indicating that a certain LPAR needed to be shutdown for a software upgrade.

In an embodiment, authorization program 199 sends sysadmin task initiation request (step 204). In other words, authorization program 199 sends a secure request to the supervisor to initiate the sysadmin task request. In an embodiment, initiating the sysadmin task indicates that the supervisor enters the privileged sysadmin task details such as the name of the system associated with the sysadmin task, the time when the sysadmin task should be initiated, the reason that the sysadmin task is necessary, and the received ticket identification (i.e., ticket id). In an embodiment, the supervisor initiates the sysadmin task request by accessing a time-sharing option on a console which is creates an interactive session between the supervisor and the operating system of the system that provides a single-user login and a basic command prompt interface for use by the supervisor. According to an embodiment of the present invention, authorization program 199 sends a sysadmin task initiation request over secure network 110 to supervisor client device 120. For example, the program sends a sysadmin task initiation request via a secure communication channel to Sam.

In an embodiment, authorization program 199 receives a sysadmin task initiation request (step 206). In other words, authorization program 199 receives the sysadmin task initiation request input by the supervisor via the time-sharing option. In an embodiment, the information received by authorization program 199 via the sysadmin task initiation is the name of the system associated with the sysadmin task, the time when the sysadmin task should be initiated, the reason that the sysadmin task is necessary, and the received ticket id. In an embodiment, authorization program 199 on computing device 150 receives a sysadmin task initiation request over secure network 110 from supervisor client device 120. For example, the sysadmin task initiation request is received by the program from Sam via a secure network.

In an embodiment, authorization program 199 sends sysadmin notice (step 208). In other words, responsive to receiving the sysadmin task initiation request, authorization program 199 sends out a system-wide notice notifying users of one or more impending sysadmin tasks so that the users can take appropriate action to prevent interruption of their work and/or loss of their data. In an embodiment, the sysadmin notice includes relevant information concerning the sysadmin task such as identifying the sysadmin task, what system is involved, and the timing and duration of the sysadmin task. According to an embodiment of the present invention, the sysadmin notice is sent via any distribution method known in the art. In an embodiment, authorization program 199 sends a sysadmin notice over secure network 110 from computing device 150 to the users of LPAR 140 as well as to the system supervisor and the system operator. For example, a notice detailing the impending sysadmin task is securely distributed by the program to Sam, Oscar, and the users of the system being supervised by Sam and operated by Oscar.

In an embodiment, authorization program 199 sends generate request (step 210). In other words, authorization program 199 sends a request to generate (i) a unique task identification (task id) for the sysadmin task, (ii) a unique supervisor key, and (iii) a unique operator key. In an embodiment, the task id is associated with the impending, specific, one or more sysadmin tasks and can include information from the sysadmin task initiation request (e.g., the system name receiving the one or more sysadmin tasks). According to an embodiment of the present invention, the supervisor key and the operator key can be any length random set of characters (e.g., letters, numbers, and other characters) and both keys will be associated with the impending, specific one or more sysadmin tasks. In an embodiment, authorization program 199 requests generator module 160 on computing device 150 to generate a task id, a supervisor key, and an operator key. For example, the program generates a task id (i.e., "TASK-SHTDWN") for the shutdown along with both a supervisor key (i.e., "SUPKEY") and an operator key (i.e., "OPKEY").

In an embodiment, authorization program 199 receives items (step 212). In other words, authorization program 199 receives the items from the generate request. In an embodiment, the items received by authorization program 199 are the generated task id, the generated supervisor key, and the generated operator key. According to an embodiment of the present invention, authorization program 199 on computing device 150 receives the generated task id, the generated supervisor key, and the generated operator key via a secure communication over network 110 from generator module 160 on computing device 150. For example, the generated task id ("TASK-SHTDWN"), the generated supervisor key ("SUPKEY"), and the generated operator key ("OPKEY") are received by the program via a secure communication.

In an embodiment, authorization program 199 sends sysadmin task (step 214). In other words, authorization program 199 sends the requested sysadmin task to the system operator that would perform said sysadmin task. In an embodiment, there is a single sysadmin task and a single operator. In another embodiment, there are two or more sysadmin tasks and two or more operators. In yet another embodiment, there are any number of sysadmin tasks and any number of operators. According to an embodiment of the present invention, authorization program 199 sends the sysadmin task to shutdown LPAR 140-N over secure network 110 to an operator using operator client device 120. For example, the sysadmin request to shutdown the LPAR, and the associated sysadmin task "SHUTDOWN", is sent to Oscar via a secure communication by the program.

In an embodiment, authorization program 199 records information (step 216). In other words, authorization program 199 sends a request to record the relevant information associated with the sysadmin request. In an embodiment, the relevant information includes the privileged sysadmin task details such as the name of the system associated with the sysadmin task, the time when the sysadmin task should be initiated, the reason that the sysadmin task is necessary, and the received ticket id. According to an embodiment, authorization program 199 sends a request to record the task details over secure network 110 to recorder module 170 on computing device 150. For example, the shutdown of the LPAR, scheduled for today at 11:00 PM with a duration of one hour, is recorded by the program along with the related ticket information associated with the sysadmin task.

In an embodiment, authorization program 199 sends command request (step 218). In other words, authorization program 199 sends a request to the system operator to enter the sysadmin task command. In an embodiment, the sysadmin task command (e.g., shutdown, reboot, etc.) is directed to the system associated with the sent ticket and the task details previously discussed above. According to an embodiment of the present invention, authorization program 199 sends, over secure network 110, a command request from computing device 150 to operator client device 130 requesting that the sysadmin task command be entered. Because the full validation process has not yet been completed, the actual sysadmin task in the command will not be processed. For example, Oscar receives a request via a secure communication from the program to enter the sysadmin task command and Oscar enters "SHUTDOWN LPAR3" to shutdown the LPAR of interest for the software upgrade.

In an embodiment, authorization program 199 receives indication of command (step 220). In other words, authorization program 199 receives an indication that the requested sysadmin task command was entered by a system operator. In an embodiment, authorization program 199 on computing device 150 receives an indication of the entered sysadmin task command over secure network 110 from operator computing device 130. For example, the program receives an indication that Oscar has entered the sysadmin task command for the shutdown of LPAR3.

In an embodiment, authorization program 199 determines whether the system is valid (decision step 222). In other words, responsive to receiving the sysadmin task command for the system of interest, authorization program 199 determines whether the identified system is a valid system. In an embodiment, the determination is made by comparing the system of interest associated with the sysadmin task command with the name of the system associated with the sysadmin task initiation request. In one embodiment (decision step 222, NO branch), authorization program 199 determines that the identified system is not a valid system; therefore, authorization program 199 proceeds to step 256 to record the unauthorized sysadmin request. In the embodiment (decision step 222, YES branch), authorization program 199 determines that the identified system is a valid system; therefore, authorization program 199 proceeds to step 224.

In an embodiment, authorization program 199 sends encryption request (step 224). In other words, responsive to determining that the system is valid, authorization program 199 sends a request encryption module 190 to encrypt the supervisor key and the operator key and receives the encrypted keys back from encryption module 190. In an embodiment, authorization program 199 sends the supervisor key and the operator key to encryption module 190 with request to encrypt and encryption module 190 sends the encrypted keys back to authorization program 199. In another embodiment, encryption module 190 retrieves the supervisor key and the operator key from a memory where the keys were stored by authorization program 199 and authorization program 199 retrieves the encrypted keys from the memory where they were stored by encryption module 190. According to an embodiment of the present invention, encryption module 190 encrypts the supervisor key and the operator key using any encryption method known in the art. In an embodiment, authorization program 199 sends a request over secure network 110 to encryption module 190 on computing device 150 requesting that the supervisor key and the operator key be encrypted. In the embodiment, encryption module 190 returns both encrypted keys to authorization program 199. For example, the program sends, via secure communication, the supervisor key (i.e., "SUPKEY") and the operator key (i.e., "OPKEY") to an encryption tool and the encryption tool returns the encrypted supervisor key (i.e., "A1B2C3") and the encrypted operator key (i.e., "#?$@!") to the program using a secure communication channel.

In an embodiment, authorization program 199 sends operator key (step 226). In other words, authorization program 199 sends the encrypted operator key to the operator of the system. In an embodiment, authorization program 199 sends the actual encrypted operator key to the operator. In another embodiment, authorization program 199 sends a link and a passcode to the operator so that the operator can retrieve the encrypted operator key from a secure storage location. In an embodiment, authorization program 199 sends the encrypted operator key over secure network 110 to operator client device 130. For example, the program sends the encrypted operator key "#?$@!" to Oscar via a secure communication.

In an embodiment, authorization program 199 sends task id (step 228). In other words, authorization program 199 sends the task id to the operator of the system. In an embodiment, authorization program 199 sends the actual task id to the operator. In another embodiment, authorization program 199 sends a link and a passcode to the operator so that the operator can retrieve the task id from a storage location. In an embodiment, authorization program 199 sends the task id over secure network 110 to operator client device 130. For example, the program sends the task id "TASK-SHTDWN" using a secure network to Oscar.

In an embodiment, authorization program 199 sends supervisor key (step 230). In other words, authorization program 199 sends the encrypted supervisor key to the supervisor of the system. In an embodiment, authorization program 199 sends the actual encrypted supervisor key to the supervisor. In another embodiment, authorization program 199 sends a link and a passcode to the supervisor so that the supervisor can retrieve the encrypted supervisor key from a secure storage location. In an embodiment, authorization program 199 sends the encrypted supervisor key over secure network 110 to supervisor client device 120. For example, the program sends the encrypted supervisor key "A1B2C3" via a secure communication to Sam.

In an embodiment, authorization program 199 receives an indication of task id entered (step 232). In other words, responsive to the operator receiving the task id and entering said task id into the system of interest, authorization program 199 receives an indication that the task id was entered. In an embodiment, authorization program 199 on computing device 150 receives an indication over secure network 110 of the entered task id from operator computing device 130.

For example, the program receives, via a secure communication, an indication that Oscar has entered the task id "TASK-SHTDWN" for the shutdown of LPAR3.

In an embodiment, authorization program 199 determines whether the task id is valid (decision step 234). In other words, responsive to receiving the indication that the operator has entered the task id, authorization program 199 determines whether the task id is valid. According to an embodiment of the present invention, the determination is made by comparing the task id entered by the operator with the task id generated by generator module 160 that was sent to authorization program 199. If the entered task id matches the generated task id, the privileged operator is validated which completes a first stage of the multi-stage authorization method. In one embodiment (decision step 234, NO branch), authorization program 199 determines that the task id is not valid; therefore, authorization program 199 proceeds to step 256 to record the unauthorized sysadmin request. In the embodiment (decision step 234, YES branch), authorization program 199 determines that the task id is valid; therefore, authorization program 199 proceeds to step 236.

In an embodiment, authorization program 199 receives an indication of operator key entered (step 236). In other words, authorization program 199 receives an indication that the operator has entered the encrypted operator key into the system. In an embodiment, the operator enters the encrypted operator key in response to the successful completion of the first stage of the multi-state authorization. In another embodiment, the operator enters the encrypted operator key because the operator received, or retrieved, the encrypted operator key. In an embodiment, authorization program 199 receives an indication over secure network 110 that the encrypted operator key was entered on operator computing device 130. For example, the program receives an indication of Oscar entering the encrypted operator key "#?$@!" using a computing device connected to LPAR3.

In an embodiment, authorization program 199 decrypts operator key (step 238). In other words, responsive to receiving the indication of the operator entering the encrypted operator key, authorization program 199 sends a request to decrypt the entered operator key and to return the decrypted operator key to authorization program 199. According to an embodiment of the present invention, the encryption method, known in the art, used to encrypt the operator key can be used to decrypt the encrypted operator key. According to another embodiment of the present invention, any decryption method known in the art that is compatible with the encryption method used to encrypt the operator key can be used to decrypt the encrypted operator key. In an embodiment, authorization program 199 sends a request over secure network 110 to encryption module 190 to decrypt the operator key and to return the decrypted operator key to authorization program 199 via the secure network 110. For example, the program decrypts the encrypted operator key (i.e., #?$@!) entered by Oscar and the decrypted operator key (i.e., "OPKEY") is returned to the program via a secure communication channel.

In an embodiment, authorization program 199 determines whether operator key is valid (decision step 240). In other words, responsive to receiving the decrypted operator key, authorization program 199 determines whether the operator key is valid. In an embodiment, the determination is made by comparing the decrypted operator key to the original, generated operator key. If the decrypted operator key matches the original, generated operator key, the operator key is validated which completes a second stage of the multi-stage authorization method. In one embodiment (decision step 240, NO branch), authorization program 199 determines that the operator key is not valid; therefore, authorization program 199 proceeds to step 256 to record the unauthorized sysadmin request. In the embodiment (decision step 240, YES branch), authorization program 199 determines that the operator key is valid; therefore, authorization program 199 proceeds to step 242.

In an embodiment, authorization program 199 receives an indication of supervisor key sent (step 242). In other words, authorization program 199 receives an indication that the supervisor sent the encrypted supervisor key, using a secure communication channel, to the operator of the system. In an embodiment, authorization program 199 receives an indication that the encrypted supervisor key was sent from supervisor client device 120 to operator client device 130 over secure network 110. For example, the program receives an indication that Sam sent the encrypted supervisor key "A1B2C3" to Oscar using a secure communication channel.

In an embodiment, authorization program 199 receives an indication of supervisor key entered (step 244). In other words, authorization program 199 receives an indication that the operator has entered the encrypted supervisor key into the system. In an embodiment, the supervisor enters the encrypted supervisor key in response to the successful completion of the second stage of the multi-state authorization. In another embodiment, the supervisor enters the encrypted supervisor key because the supervisor received, or retrieved, the encrypted supervisor key. In an embodiment, authorization program 199 receives an indication over secure network 110 that the encrypted supervisor key was entered on operator computing device 130. For example, the program receives an indication of Oscar entering the encrypted supervisor key "A1B2C3" using a computing device connected to LPAR3.

In an embodiment, authorization program 199 decrypts supervisor key (step 246). In other words, responsive to receiving the indication of the operator entering the encrypted supervisor key, authorization program 199 sends a request to decrypt the entered supervisor key and to return the decrypted supervisor key to authorization program 199. According to an embodiment of the present invention, the encryption method, known in the art, used to encrypt the supervisor key can be used to decrypt the encrypted supervisor key. According to another embodiment of the present invention, any decryption method known in the art that is compatible with the encryption method used to encrypt the supervisor key can be used to decrypt the encrypted supervisor key. In an embodiment, authorization program 199 sends a request over secure network 110 to encryption module 190 to decrypt the supervisor key and to return the decrypted supervisor key to authorization program 199 via the secure network 110. For example, the program decrypts the encrypted supervisor key (i.e., "A1B2C3") entered by Oscar and the decrypted supervisor key (i.e., "SUPKEY") is returned to the program via a secure communication channel.

In an embodiment, authorization program 199 determines whether supervisor key is valid (decision step 248). In other words, responsive to receiving the decrypted supervisor key, authorization program 199 determines whether the supervisor key is valid. In an embodiment, the determination is made by comparing the decrypted supervisor key to the original, generated supervisor key. If the decrypted supervisor key matches the original, generated supervisor key, the supervisor key is validated which completes a third stage of the multi-stage authorization method. In one embodiment (decision step 248, NO branch), authorization program 199 determines that the supervisor key is not valid; therefore, authorization program 199 proceeds to step 256 to record the unauthorized sysadmin request. In the embodiment (decision step 248, YES branch), authorization program 199 determines that the supervisor key is valid; therefore, authorization program 199 proceeds to step 250.

In an embodiment, authorization program 199 provides indication of successful validation (step 250). In other words, responsive to successfully completing the three stages of authorization, authorization program 199 provides an indication of a successful validation of the sysadmin task. In an embodiment, the provided indication is a message displayed on a user interface (not shown in FIG. 1) of the supervisor and the operator. In another embodiment, the provided indication is an e-mail message, or any other type of message known in the art, sent to the supervisor and the operator. In yet another embodiment, the provided indication is any type of notification known in the art used to notify one or more users. According to an embodiment of the present invention, authorization program 199 on computing device 150 sends an e-mail over secure network 110 to supervisor client device 120 and operator client device 130 providing an indication that the sysadmin task was successfully validated. For example, the program sends an e-mail to Sam and Oscar indicating that the sysadmin task was successfully validated.

In an embodiment, authorization program 199 records validated credentials (step 252). In other words, authorization program 199 sends a request to record the validated credentials (i.e., the three stages of the multi-stage authorization method) associated with the sysadmin request. In an embodiment, the validated credentials include (i) the validation of the privileged operator via the task id, (ii) the validated operator key, and (iii) the validated supervisor key. In another embodiment, in addition to the validated credentials, all information associated with the sysadmin request is recorded. According to an embodiment of the present invention, authorization program 199 sends a request over secure network 110 to recorder module 170 on computing device 150 to record the validated credentials. For example, the operator Oscar validated via the task id as the privileged operator, the operator key, and the supervisor key are recorded by the program along with the related ticket information associated with the sysadmin task.

In an embodiment, authorization program 199 authorizes initiation of sysadmin task (step 254). In other words, responsive to providing an indication of the successful validation and recording the validated credentials, authorization program 199 authorizes the initiation of the sysadmin task. According to an embodiment of the present invention, the authorized initiation of the sysadmin task results in the sysadmin task command being initiated on the system associated with the sent ticket and the task details previously discussed above. In an embodiment, authorization program 199 sends, over secure network 110, an initiation request from computing device 150 to operator client device 130 indicating that the sysadmin task command can now be entered. For example, Oscar receives an initiation request via a secure communication from the program to enter the sysadmin task command and Oscar enters "SHUTDOWN LPAR3" to shutdown the LPAR of interest for the software upgrade.

In an embodiment, authorization program 199 records unauthorized sysadmin request (step 256). In other words, authorization program 199 sends a request to record the unauthorized sysadmin request attempt(s) associated with the sysadmin request. In an embodiment, the unauthorized sysadmin request(s) include (i) the system not validated properly, (ii) the task id not validated properly, (iii) the operator key not validated properly, and (iv) the supervisor key not validated properly. According to an embodiment of the present invention, authorization program 199 sends a request over secure network 110 to recorder module 170 on computing device 150 to record the unauthorized sysadmin request(s). For example, an attempt made by Oscar to perform the sysadmin task on LPAR1 (rather than the correct LPAR3) was recorded by the program as an unauthorized sysadmin request.

In an embodiment, authorization program 199 sends notification (step 258). In other words, responsive to recording the unauthorized sysadmin request(s), authorization program 199 sends a notification of the unauthorized sysadmin request(s). In an embodiment, the sent notification is a message displayed on a user interface (not shown in FIG. 1) of the supervisor and the operator. In another embodiment, the sent notification is an e-mail message, or any other type of message known in the art, sent to the supervisor and the operator associated with the sysadmin task request. In yet another embodiment, the sent notification is any type of notification known in the art used to notify one or more users. According to an embodiment of the present invention, authorization program 199 on computing device 150 sends an e-mail over secure network 110 to supervisor client device 120 and operator client device 130 providing a notification of the unauthorized sysadmin request(s). For example, the program sends an e-mail to Sam and Oscar indicating that Oscar attempted to perform the sysadmin task on LPAR1 instead of the correct LPAR3.

Figure 3:
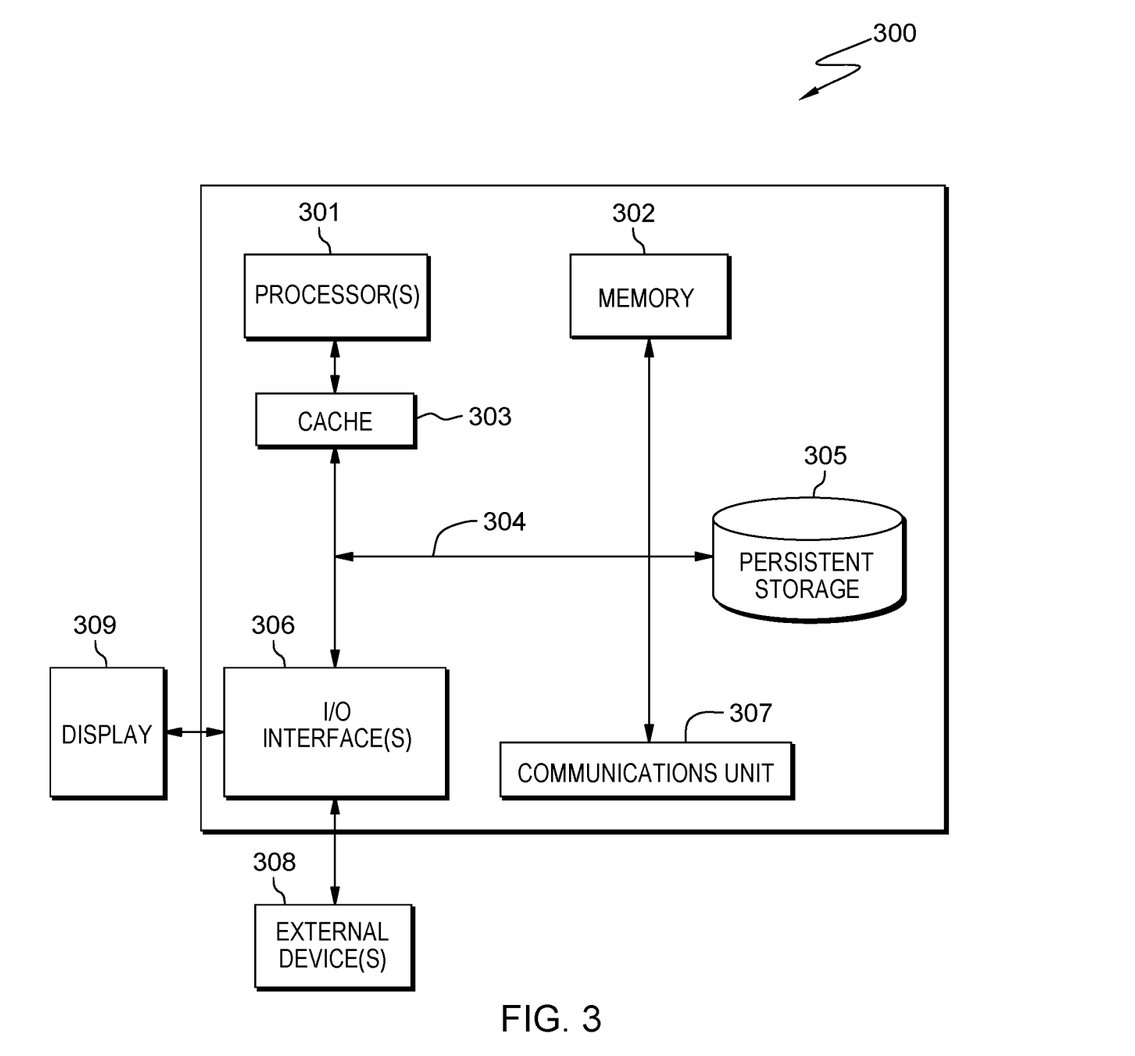
FIG. 3 depicts a block diagram of components of the computing environment of FIG. 1, in accordance with an embodiment of the present invention.

FIG. 3 depicts computer system 300, which is an example of a system that includes preemption program 136. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer-implemented method, the computer-implemented method comprising:
    responsive to receiving a request to initiate a system administration task, generating, by one or more computer processors, a task identification, an operator key, and a supervisor key, wherein:
        the task identification is associated with the system administration task request;
        the task identification includes information from the request to initiate the system administration task request such as a system name; and
        the generated operator key and the generated supervisor key are encrypted;
    sending, by one or more computer processors, the task identification and the operator key to an operator computing device via a secure network and the supervisor key to a supervisor computing device via the secure network;
    determining, by one or more computer processors, whether the task identification is valid;
    responsive to determining that the task identification is valid, decrypting, by one or more computer processors, the encrypted operator key returned from the operator computing device;
    determining, by one or more computer processors, whether the decrypted operator key is valid;
    responsive to determining that the decrypted operator key is valid, decrypting, by one or more computer processors, the encrypted supervisor key returned from the supervisor computing device;
    determining, by one or more computer processors, whether the decrypted supervisor key is valid; and
    responsive to determining that the decrypted supervisor key is valid, providing, by one or more computer processors, an indication of a successful validation of the system administration task.

2. The computer-implemented method of claim 1, wherein the step of determining, by one or more computer processors, whether the task identification is valid, comprises:
    comparing, by one or more computer processors, a system of interest associated with the system administration task command with the system name associated with the sysadmin task initiation request; and
    validating, by one or more computer processors, the task identification when the system of interest associated with the system administration task command matches the name of the system associated with the system administration task initiation request.

3. The computer-implemented method of claim 1, wherein the step of determining, by one or more computer processors, whether the decrypted operator key is valid, comprises:
    comparing, by one or more computer processors, the decrypted operator key to the generated operator key, and
    validating, by one or more computer processors, the decrypted operator key when the decrypted operator key matches the original, generated operator key.

4. The computer-implemented method of claim 1, wherein the step of determining, by one or more computer processors, whether the decrypted supervisor key is valid, comprises:
    comparing, by one or more computer processors, the decrypted supervisor key to the generated supervisor key, and
    validating, by one or more computer processors, the decrypted supervisor key when the decrypted supervisor key matches the original, generated supervisor key.

5. The computer-implemented method of claim 1, further comprising:
    determining, by one or more computer processors whether the system is valid;
    responsive to determining that the system is not valid, recording, by one or more computer processors, an unauthorized system administration request; and
    sending, by one or more computer processors, a notification, wherein:
        the notification is selected from the group consisting of a message displayed on a user interface and an e-mail message; and
        the notification is sent to a system administrator and a system operator associated with the system administration task request.

6. The computer-implemented method of claim 5, further comprising:
    responsive to determining that (i) the task identification is not valid, (ii) the decrypted operator key is not valid, or (iii) the decrypted supervisor key is not valid, sending, by one or more computer processors, the notification.

7. The computer-implemented method of claim 1, further comprising:
    responsive to providing the indication of the successful validation of the system administration task, recording, by one or more computer processors, a set of validated credentials; and
    authorizing, by one or more computer processors, initiation of the system administration task.

8. A computer program product, the computer program product comprising:
one or more computer readable storage media; and
program instructions stored on the one or more computer readable storage media, the program instructions comprising:
responsive to receiving a request to initiate a system administration task, program instructions to generate a task identification, an operator key, and a supervisor key, wherein:
the task identification is associated with the system administration task request;
the task identification includes information from the request to initiate the system administration task request such as a system name; and
the generated operator key and the generated supervisor key are encrypted;
program instructions to send the task identification and the operator key to an operator computing device via a secure network and the supervisor key to a supervisor computing device via the secure network;
program instructions to determine whether the task identification is valid;
responsive to determining that the task identification is valid, program instructions to decrypt the encrypted operator key returned from the operator computing device;
program instructions to determine whether the decrypted operator key is valid;
responsive to determining that the decrypted operator key is valid, program instructions to decrypt the encrypted supervisor key returned from the supervisor computing device;
program instructions to determine whether the decrypted supervisor key is valid; and
responsive to determining that the decrypted supervisor key is valid, program instructions to provide an indication of a successful validation of the system administration task.

9. The computer program product of claim 8, wherein the program instructions to determine whether the task identification is valid, comprise:
program instructions to compare a system of interest associated with the system administration task command with the system name associated with the system administration task initiation request; and
program instructions to validate the task identification when the system of interest associated with the system administration task command matches the name of the system associated with the system administration task initiation request.

10. The computer program product of claim 8, wherein the program instructions to determine whether the decrypted operator key is valid, comprises:
program instructions to compare the decrypted operator key to the generated operator key, and
program instructions to validate the decrypted operator key when the decrypted operator key matches the original, generated operator key.

11. The computer program product of claim 8, wherein the program instructions to determine whether the decrypted supervisor key is valid, comprises:
program instructions to compare the decrypted supervisor key to the generated supervisor key, and
program instructions to validate the decrypted supervisor key when the decrypted supervisor key matches the original, generated supervisor key.

12. The computer program product of claim 8, further comprising program instructions stored on the one or more computer readable storage media, to:
determine whether the system is valid;
responsive to determining that the system is not valid, record an unauthorized system administration request; and
send a notification, wherein
the notification is selected from the group consisting of a message displayed on a user interface and an e-mail message; and
the notification is sent to a system administrator and a system operator associated with the system administration task request.

13. The computer program product of claim 12, further comprising program instructions stored on the one or more computer readable storage media, to:
responsive to determining that (i) the task identification is not valid, (ii) the decrypted operator key is not valid, or (iii) the decrypted supervisor key is not valid, send the notification.

14. The computer program product of claim 8, further comprising program instructions stored on the one or more computer readable storage media, to:
responsive to providing the indication of the successful validation of the system administration task, record a set of validated credentials; and
authorize initiation of the system administration task.

15. A computer system, the computer system comprising:
one or more computer processors;
one or more computer readable storage media; and
program instructions stored on the one or more computer readable storage media for execution by at least one of the one or more computer processors, the program instructions comprising:
responsive to receiving a request to initiate a system administration task, program instructions to generate a task identification, an operator key, and a supervisor key, wherein:
the task identification is associated with the system administration task request;
the task identification includes information from the request to initiate the system administration task request such as a system name; and
the generated operator key and the generated supervisor key are encrypted;
program instructions to send the task identification and the operator key to an operator computing device via a secure network and the supervisor key to a supervisor computing device via the secure network;
program instructions to determine whether the task identification is valid;
responsive to determining that the task identification is valid, program instructions to decrypt the encrypted operator key returned from the operator computing device;
program instructions to determine whether the decrypted operator key is valid;
responsive to determining that the decrypted operator key is valid, program instructions to decrypt the encrypted supervisor key returned from the supervisor computing device;
program instructions to determine whether the decrypted supervisor key is valid; and responsive to determining that the decrypted supervisor key is valid, program instructions to provide an indication of a successful validation of the system administration task.

16. The computer system of claim 15, wherein the program instructions to determine whether the task identification is valid, comprise:
   program instructions to compare a system of interest associated with the system administration task command with the system name associated with the system administration task initiation request; and
   program instructions to validate the task identification when the system of interest associated with the system administration task command matches the name of the system associated with the system administration task initiation request.

17. The computer system of claim 15, wherein the program instructions to determine whether the decrypted operator key is valid, comprises:
   program instructions to compare the decrypted operator key to the generated operator key, and
   program instructions to validate the decrypted operator key when the decrypted operator key matches the original, generated operator key.

18. The computer system of claim 15, wherein the program instructions to determine whether the decrypted supervisor key is valid, comprises:
   program instructions to compare the decrypted supervisor key to the generated supervisor key, and
   program instructions to validate the decrypted supervisor key when the decrypted supervisor key matches the original, generated supervisor key.

19. The computer system of claim 15, further comprising program instructions stored on the one or more computer readable storage media for execution by at least one of the one or more computer processors, to:
   determine whether the system is valid;
   responsive to determining that the system is not valid, record an unauthorized system administration request; and
   send a notification, wherein
      the notification is selected from the group consisting of a message displayed on a user interface and an e-mail message; and
      the notification is sent to a system administrator and a system operator associated with the system administration task request.

20. The computer system of claim 19, further comprising program instructions stored on the one or more computer readable storage media for execution by at least one of the one or more computer processors, to:
   responsive to determining that (i) the task identification is not valid, (ii) the decrypted operator key is not valid, or (iii) the decrypted supervisor key is not valid, send the notification.

\* \* \* \* \*